US009752601B2

(12) United States Patent
Giacalone et al.

(10) Patent No.: US 9,752,601 B2
(45) Date of Patent: Sep. 5, 2017

(54) FASTENER DEVICE FOR FASTENING A PANEL TO A STRUCTURE, AND AN AIRCRAFT

(71) Applicant: AIRBUS HELICOPTERS, Marignane (FR)

(72) Inventors: Jean-Michel Giacalone, Aix En Provence (FR); Clement Peyrusaubes, Aix En Provence (FR); Marc Denavaux, Nans-les-Pins (FR)

(73) Assignee: AIRBUS HELICOPTERS, Marignane (FR)

( * ) Notice: Subject to any disclaimer, the term of this patent is extended or adjusted under 35 U.S.C. 154(b) by 81 days.

(21) Appl. No.: 14/704,228

(22) Filed: May 5, 2015

(65) Prior Publication Data

US 2015/0322979 A1   Nov. 12, 2015

(30) Foreign Application Priority Data

May 12, 2014  (FR) ..................... 14 01059

(51) Int. Cl.
*B64C 1/06* (2006.01)
*F16B 1/00* (2006.01)
(Continued)

(52) U.S. Cl.
CPC ............. *F16B 1/00* (2013.01); *B64C 1/066* (2013.01); *B64D 11/00* (2013.01); *F16B 5/065* (2013.01);
(Continued)

(58) Field of Classification Search
CPC . F16B 1/00; F16B 5/065; B64C 1/066; Y10T 292/11; E05C 17/56; E05C 19/16;
(Continued)

(56) References Cited

U.S. PATENT DOCUMENTS

| 2,970,857 A | 2/1961 | Squire |
| 4,585,197 A | 4/1986 | Liautaud et al. |

(Continued)

FOREIGN PATENT DOCUMENTS

| DE | 145325 | 11/1903 |
| DE | 202004001958 | 6/2005 |

(Continued)

OTHER PUBLICATIONS

Chinese First Office Action Dated Aug. 2, 2016, Application No. 201510238955.5, Applicant Airbus Helicopters, 5 Pages.
(Continued)

*Primary Examiner* — Assres H Woldemaryam
(74) *Attorney, Agent, or Firm* — Brooks Kushman P.C.

(57) ABSTRACT

A fastener device provided with at least one movable stud and a stationary stud, the movable stud including first magnetization means that co-operate with second magnetization means of the stationary stud. At least one magnetization means is carried by a ball joint, each magnetization means being carried by movement means that cause the magnetization means to move in translation along a longitudinal axis from an engagement position to a disengagement position in reversible manner, the magnetization means being strongly magnetically attracted to each other when they are facing and each in the engagement position and being magnetically attracted only slightly or not at all when at least one magnetization means is in the disengagement position.

20 Claims, 4 Drawing Sheets

(51) Int. Cl.
   *F16B 5/06* (2006.01)
   *B64D 11/00* (2006.01)
   *H01F 7/02* (2006.01)
(52) U.S. Cl.
   CPC .... *H01F 7/0252* (2013.01); *F16B 2001/0035* (2013.01); *Y02T 50/46* (2013.01); *Y10T 24/30* (2015.01); *Y10T 24/303* (2015.01)
(58) Field of Classification Search
   CPC .... E05C 19/163; E05C 19/166; E05C 19/168; H01F 7/0242; B64D 11/00
   USPC .................. 244/131, 132; 24/303, 114.2, 457
   See application file for complete search history.

(56) References Cited

U.S. PATENT DOCUMENTS

| | | |
|---|---|---|
| 5,280,991 A | 1/1994 | Weiland |
| 7,178,207 B2 | 2/2007 | Wong et al. |
| 7,422,403 B1 * | 9/2008 | Johnson ................ B23P 11/025 411/392 |
| 2002/0197107 A1 | 12/2002 | Granata |
| 2008/0143030 A1 | 6/2008 | Roth |
| 2012/0025022 A1 | 2/2012 | Buchs et al. |
| 2012/0145829 A1 * | 6/2012 | Stierle .................. B64D 11/003 244/131 |
| 2014/0109352 A1 * | 4/2014 | Violato .............. A44B 17/0076 24/303 |

FOREIGN PATENT DOCUMENTS

| | | |
|---|---|---|
| GB | 1056797 | 1/1967 |
| WO | 2009108461 | 9/2009 |

OTHER PUBLICATIONS

French Search Report Dated Jan. 14, 2015, Application No. FR 1401060, Applicant Airbus Helicopters, 6 Pages.

U.S. Office Action Dated Aug. 25, 2016, U.S. Appl. No. 14/704,238, 12 Pages.

* cited by examiner

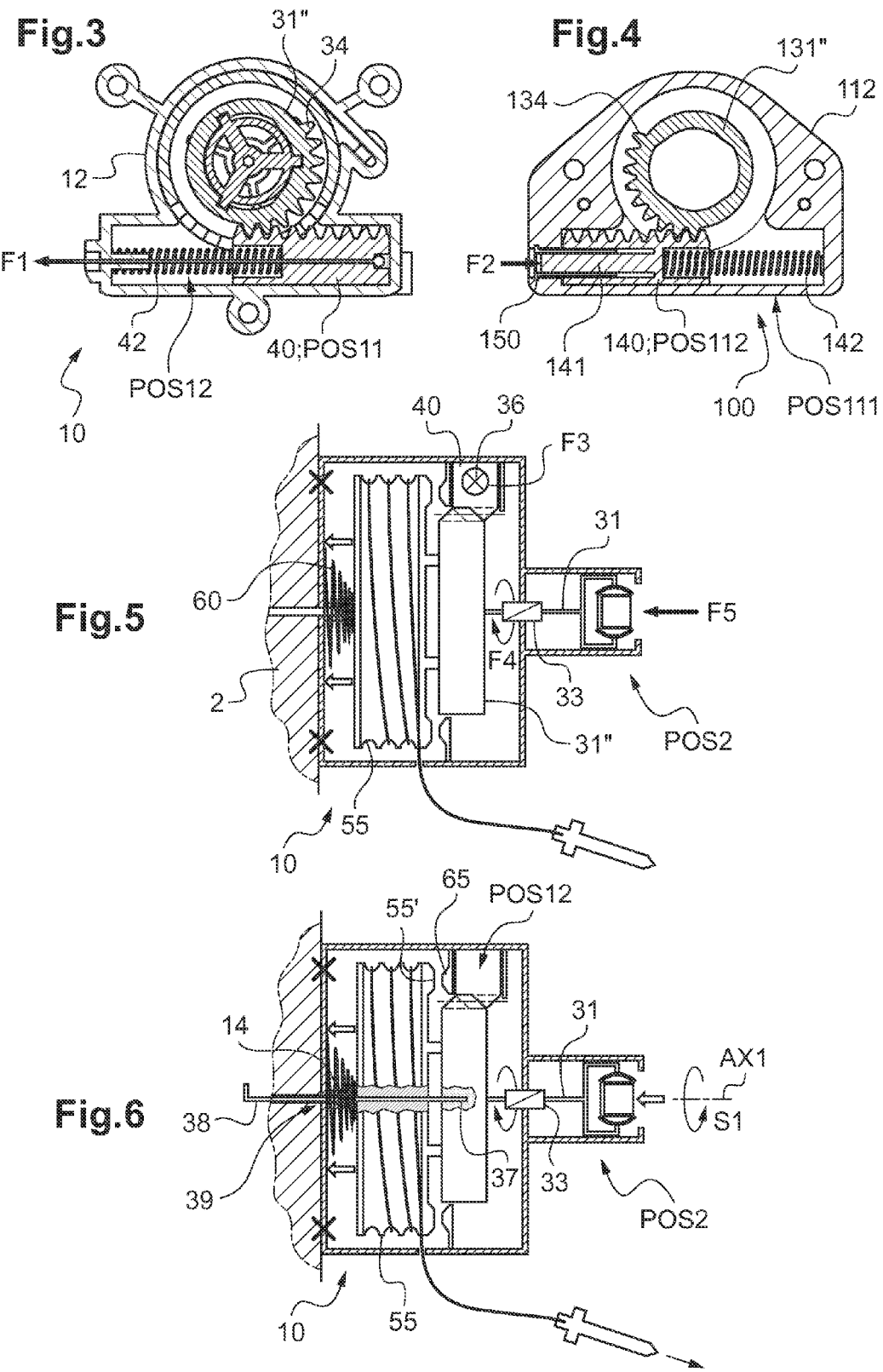

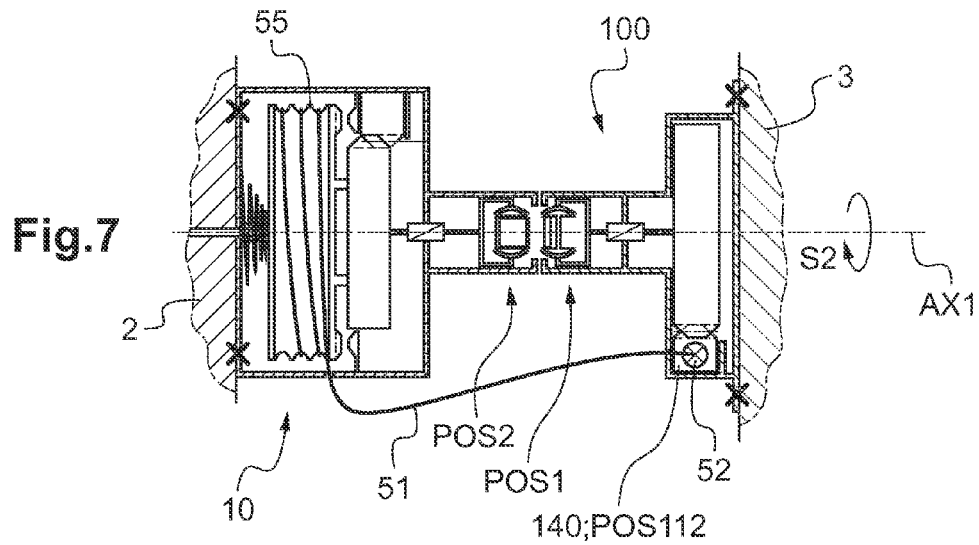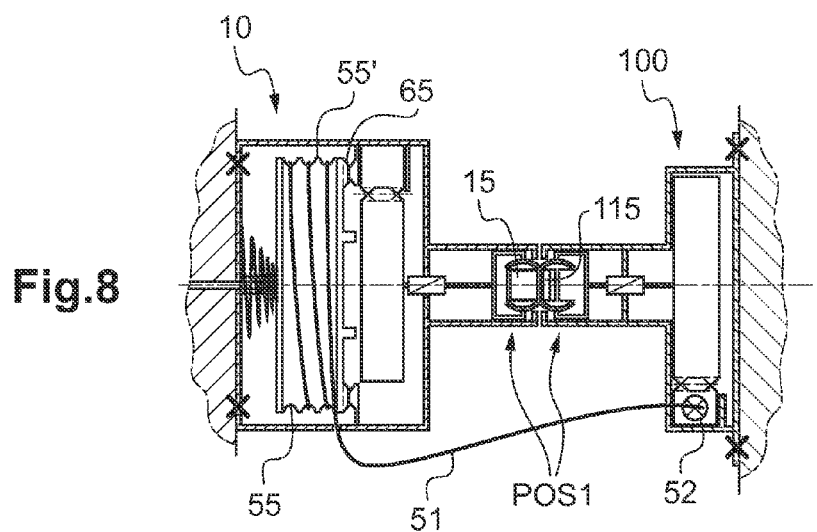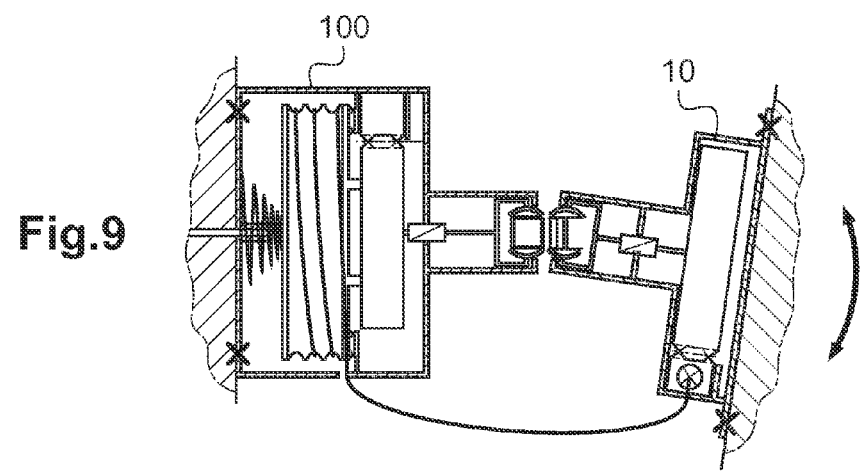

FASTENER DEVICE FOR FASTENING A PANEL TO A STRUCTURE, AND AN AIRCRAFT

CROSS REFERENCE TO RELATED APPLICATION

This application claims priority to French patent application No. FR 14 01059 filed on May 12, 2014, the disclosure of which is incorporated in its entirety by reference herein.

BACKGROUND OF THE INVENTION (1) Field of the Invention

The present invention relates both to a fastener device for fastening a panel and in particular a trim panel of a vehicle cabin, and also to an aircraft provided with the device.

(2) Description of Related Art

An aircraft usually includes panels covering the walls of a vehicle cabin. Under such circumstances, such panels are commonly referred to as "trim panels".

The panels are fastened to the structures defining the vehicle cabin by devices referred to for convenience as "fastener devices".

A known fastener device includes screw-fastener means. Each panel is then directly screw-fastened to a structure.

Such a screw-fastening fastener device has the advantage of being reliable and inexpensive.

However, that fastener device is by its very nature visible, and that can be detrimental to visual appearance in some aircraft.

In addition, that fastener device may involve tight mounting tolerances, and can therefore lead to difficulties of assembly.

Furthermore, an aircraft may be subjected to vibration. A screw-fastener device has low damping capacity against vibration.

Other fastener devices implement ball-lock pins or pegs and receptacles interposed between the panel and the structure.

Those fastener devices are thus less visible or even invisible, and their mounting tolerances are advantageous.

However, those fastener devices can be expensive, with little capacity for damping vibration.

In addition, an aircraft must comply with certification rules in terms of crashworthiness. Demonstrating that those fastener devices are crashworthy can turn out to be tricky.

Consequently, implementation of a fastener device for fastening a panel on an aircraft leads to specific difficulties in terms of vibration and of crashworthiness in particular. The invention is therefore particularly situated in this technical field.

Under such circumstances, a fastener device for fastening a panel of an aircraft may include at least one of the following advantages: being as invisible as possible; easy to assemble; lightweight; inexpensive; reliable; vibration-damping; and compatible with certification regulations in terms of crashworthiness.

Document US 2002/197107 describes a fastener device for fastening a decorative panel to a motor vehicle. That document therefore does not make reference to the problems specific to an aircraft.

The fastener device is provided with a base connected to a carrier plate. The carrier plate supports fastener means that may be magnetic.

Document WO 2009/108461 relates to a magnetic fastener provided with a support. An annular magnetic assembly carrying a magnet is then engaged about a stud of the support and a magnet.

The support is then fastened to a member for attaching said member to a metal plate via the magnet.

That device is advantageous. However, the arrangement of a trim panel against an aircraft structure may generate positioning constraints such as misalignment of the panel relative to the structure.

In addition, a magnet is likely to be damaged when the magnet comes into "violent" contact with another magnet or with a metal plate. Magnets have relatively little resistance to shock.

A magnet may also be tricky to make crashworthy.

Document U.S. Pat. No. 5,280,991 describes a magnetic fastener device for a vehicle roof panel. That fastener device includes magnets incorporated on a periphery of the panel.

Document U.S. Pat. No. 7,178,207 describes a magnetic fastener device having two magnets.

The following documents are also known: GB 1 056 797 A; U.S. Pat. No. 4,585,197 A; U.S. Pat. No. 2,970,857 A; DE 145 325 C; US 2008/143030 A1; and DE 20 2004 001958 U1.

BRIEF SUMMARY OF THE INVENTION

The present invention thus aims to provide a fastener device seeking to present at least one of the following advantages: being as invisible as possible; easy to assemble; lightweight; inexpensive; reliable; vibration-damping; and compatible with certification regulations in terms of crashworthiness.

The invention therefore seeks to provide a fastener device for fastening a panel to a structure, said fastener device being provided with at least one reversible fastener assembly including a movable stud suitable for being fastened to the panel and a stationary stud suitable for being fastened to the structure, the movable stud including first magnetization means co-operating with second magnetization means of the stationary stud, at least one of the magnetization means including a magnet.

In addition, at least one magnetizing means is carried by a ball joint of the associated stud.

In addition, each magnetization means is constrained to move in translation with movement means in order to be moved in translation in reversible manner along a longitudinal axis of the associated stud from an engagement position to a disengagement position.

The magnetization means are strongly magnetically attracted to each other when they are facing and each in the engagement position, and being magnetically attracted only slightly or not at all when at least one magnetization means is in the disengagement position.

Each magnetization means is then either fastened directly to the corresponding movement means, or is carried by a ball joint that is fastened to the movement means. Each magnetization means may possibly be carried by a ball joint.

In addition, the longitudinal axis of the movable stud, referred to as the "first longitudinal axis" is substantially parallel to the longitudinal axis of the stationary stud referred to as the "second longitudinal axis". The term "substantially horizontal" is used to mean that the first longitudinal axis and the second longitudinal axis are on the same axis when the movable stud and the stationary stud are properly positioned and magnetically attached to each other. Under such circumstances, each magnetization means carried by a ball joint has three degrees of freedom to move in rotation relative to a casing of the associated stud as provided by said ball joint. These degrees of freedom make it possible to accommodate an offset between the movable stud and the stationary stud, e.g. an angular offset, a transverse offset, and/or an offset in elevation.

Consequently, the fastener device provides the assembly with advantageous tolerance. This characteristic makes it possible to be more flexible with the accuracy with which the panel is positioned relative to the structure that is to receive trim.

In addition, these degrees of freedom to move in rotation tend to reduce the risk of the device jamming, e.g. as a result of wedging, caused by deformation of the trim panel or of the structure that is to receive trim.

Furthermore, the movable stud may be put side by side against an inside face of the panel that faces a face of said structure. As a result, the fastener device is barely visible from inside a cabin.

In addition, the fastener device may be standardized so as to be used for fastening multiple separate panels. This standardization may facilitate the work of an engineering and design department carrying out an interior installation. In addition, standardization makes it possible to facilitate the making of interface planes between the panels and the structures that are to be provided with trim.

In addition, this fastener device is simple to implement and tends to limit deterioration of each magnet, e.g. a high-capacity neodynium magnet.

An operator can operate the movement devices in order to position the magnetization means in their disengagement positions.

In addition to its degrees of freedom to move in rotation, each magnetization means presents a degree of freedom to move in translation along a longitudinal axis.

In order to fasten the panel onto a structure, an operator may then cause the magnetization means of the movable stud to move in translation into the disengagement position. For convenience, these magnetization means are referred to as "first magnetization means".

For ease of reading, the term "first" is used to describe a member of the movable stud and the term "second" is used to describe the corresponding member of the stationary stud.

Consequently, the operator positions the magnetization means of the stationary stud in the engagement position. These magnetization means are referred to as "second magnetization means", given the above-described convention.

The operator then pushes the panel towards the structure causing each movable stud to come substantially into contact with the corresponding stationary stud.

Since the first magnetization means of each movable stud are in the disengagement position, the magnetic attraction between the first magnetization means and the second magnetization means is weak or zero in view of the air-gap separating them.

The operator then reduces said air-gap to its minimum by causing the first magnetization means of each movable stud to move into the engagement position. The first magnetization means are then strongly magnetically attracted to the second magnetization means in order to hold the panel in position.

The longitudinal movement of the magnetization means has the noteworthy advantage of avoiding any "violent" shock between the magnetization means. In the event of a shock of this type, the magnetization means bang together and that can lead to chipping or shattering of the magnetization means and, for a magnet, to a reduction in its power of attraction.

The invention thus makes it possible to fasten a panel to a structure by using a magnetization technology that is relatively inexpensive, and that is reliable over time. This technology makes it possible to provide assembly that is invisible, reliable, and accommodating of poor alignment, providing at least one magnetization means is arranged in the cradle of a ball joint.

In order to remove a panel, the operator moves the first magnetization means of each movable stud longitudinally into its disengagement position. The force of attraction between the magnetization means of the movable stud and of the stationary stud in an assembly is then no longer sufficient to prevent an operator from moving the panel relative to the structure.

In addition, this fastener device may further include one or more of the following additional characteristics.

Thus, the fastener device may include at least one pivot joint suitable for being fastened to the panel and to the structure in order to allow the panel to move in rotation relative to the structure.

By way of example, each pivot joint is arranged in a bottom portion of a panel whereas a movable stud is fastened in a top portion of the panel.

An operator fastens the panel to the pivot joint, and then pivots the panel in order to fasten it to the structure. This pivot joint makes it easier to position the panel relative to the structure.

Furthermore, either each of the magnetization means of a fastener assembly includes a respective magnet, or one magnetization means includes a magnet and the other magnetization means includes a metal plate.

The first magnetization means and the second magnetization means may thus both include magnets.

However, if the force of attraction is very high, only one of the magnetization means need be provided with a magnet. By way of example, the first magnetization means may include a magnet, whereas the second magnetization means of a fastener assembly include a plate suitable for being magnetically attracted to said magnet.

In addition, since at least one of the magnetization means includes a face referred to as a "connection face" for being magnetically attracted to the other magnetization means, said connection face may optionally be covered by an antifriction member.

By way of example, a tab of Teflon® may be stuck on the connection face of magnetization means of the magnet type.

This characteristic is in particular advantageous in a medium that is subjected to vibration in order to prevent said vibration eroding the magnetization means and a nickel-plated protection layer thereon, if any.

In addition, at least one stud may comprise movement means provided with an arm, said arm comprising a wormscrew engaged in a nut attached to a casing of the stud, said movement means being provided with drive means for driving said arm in rotation so as to cause said arm to move in translation.

Since the nut is secured to the casing of the stud, turning the wormscrew thus causes the arm, the ball screw where applicable, and the magnetization means of the stud to move longitudinally.

This system is relatively simple and potentially inexpensive.

Furthermore, the arm may extend longitudinally from an end that is connected to magnetization means, possibly via a ball screw, towards an end that is provided with a toothed base, the drive means including a rack that is movable transversely, a periphery of said base being toothed at least in part and including at least one tooth engaged with the rack.

Consequently, a movement in translation of the rack causes the toothed base to turn on the operating principle of a cam. This turning then causes the wormscrew to turn and finally causes the wormscrew and the magnetization means to move in translation.

For this purpose, the drive means of the movable stud may include a cable that is secured to said rack.

The design of the movable studs makes it possible to use a single cable-operated control to activate a plurality of studs simultaneously. Thus, the fastener device may include a plurality of fastener assemblies, each including a movable stud and a stationary stud, the racks of a plurality of movable studs being connected to the same cable-operated control.

The linking obtained between the movable studs makes it possible to simplify control of the panel when a plurality of movable studs are used, and also makes it possible to reduce the weight of the control system.

The rack may also be controlled by an electric system, for example

In alternative or complementary manner, the drive means of a movable stud may comprise an orifice in the arm that is suitable for receiving the head of a screw-turning tool, a casing of said movable stud including a passage for guiding such a tool towards said orifice.

The drive means thus include a tool, such as for example an Allen key. This tool advances within the movable stud in order to be received in an orifice in the arm of the movement means, e.g. in the above-described toothed base.

The fastener device may thus offer at least two distinct possibilities, in particular for controlling the position of the magnetization means of a movable stud.

In addition, the fastener device may include a crash-proofing system provided with a safety line that is wound around an automatically-locking winder of said movable stud, said safety line carrying a ball-lock pin that can be inserted manually and in reversible manner in a receptacle of said stationary stud. This receptacle may be secured to a casing of the stationary stud.

Each fastener assembly, or at least one of them, may include a crash-proofing system implementing a safety line extending between the movable stud and the stationary stud.

This architecture makes it possible to separate the function of holding the panel for operational loads as carried out using the magnetization means for withstanding low forces, from the function of holding the panel for crash loads as carried out using the crash-proofing system to withstand high forces.

In parallel with the magnetization means, a cord restraint system makes it possible to withstand the forces associated with a crash. The safety line represents a cord mounted on an automatically-locking winder that makes it possible to minimize the movement of the panel relative to the structure in the event of a crash.

Moreover, this safety line allows the panel to be held in a half-open position for maintenance activities.

This safety line is dimensioned to withstand forces that are relatively high compared with its own weight. This dimensioning is relatively simple to perform.

Indeed, the forces exerted on the fastener device at the time of a crash can tend to separate the first and second magnetization means of a fastener assembly. The panel then moves away from the carrier structure until it is in an open position that is reached when the safety line is under tension.

By way of example, the winder is movable in translation along the first longitudinal axis of the movable stud while being arranged around guide means of a casing of the movable stud, the winder being pressed by means of a spring member against the movement means so as to be constrained to move in translation with the magnetization means of the movable stud.

In addition, the casing may include at least one tooth that co-operates with the toothed face of the winder in order to prevent rotation of the winder in an unwinding direction of rotation that makes it possible to empty out said safety line, when the magnetization means are in the engagement position.

While the panel is being locked, the first magnetization means and the winder are in their engagement positions. The toothed face of the winder is then engaged on at least one tooth of the casing. This tooth then prevents rotation of the winder tending to unwind the safety line. The length of the safety line between the movable stud and the stationary stud is thus constant while in this engagement position.

In contrast, in the disengagement position, it is possible to unwind the safety line, since the winder is not constrained to rotate with the magnetization means. This characteristic enables maintenance actions to be performed.

Consequently, the winder is generally locked in rotation, except when a voluntary action causes the first magnetization means of the movable stud to move towards the center of the first casing of the movable stud. At the time of this voluntary action, the safety line can be unwound, in particular so as to be able to engage the ball-lock pin in the dedicated receptacle of the stationary stud. However, in the event of a crash, the winder is locked by the dog clutch teeth of the first casing in order to retain the panel, in the event of the magnetization means becoming separated.

Furthermore, said receptacle may have passing therethrough a pin of a rack that is engaged on the movement means of the stationary stud in the absence of the ball-lock pin, said magnetization means of the stationary stud being in the disengaged position in the absence of the ball-lock pin.

This characteristic obliges an operator to fasten the ball-lock pin of a movable stud to a stationary stud in order to be able to secure the movable stud to the stationary stud. The safety of the fastener device is thus optimized.

In addition, the winder may include a return spring tending to generate rotation of the winder in a winding direction of rotation in order to wind said safety line around the winder.

While the panel is being closed, the safety line is automatically rewound by means of the return spring of the winder.

In addition, since the movable stud includes a rack referred to as a "first rack" co-operating with the movement means of the movable stud referred to as "first movement means", and since said first rack is movable between a first position setting the magnetization means of the movable stud into the engagement position and a second position setting the magnetization means of the movable stud into the disengagement position, said movable stud includes a first spring member exerting a force tending to position the first rack in the first position. Thus, only a voluntary action can lead to the first magnetization means being positioned in the disengagement position in order to optimize the safety of the fastener device.

Since the stationary stud includes a rack referred to as a "second rack" that co-operates with the movement means of the stationary stud referred to as "second movement means", and since said second rack is movable between a first position setting the magnetization means of the stationary stud into the engagement position and a second position setting the magnetization means of the stationary stud into the disengagement position, said stationary stud may include a second spring member exerting a force tending to position the second rack in the second position. Thus, only a voluntary action can lead to the second magnetization means being positioned in the engagement position in order to optimize the safety of the fastener device, e.g. by requiring insertion of a ball-lock pin.

In an embodiment, the movable stud may then include first magnetization means carried by first movement means, said first movement means including an arm connected to the first magnetization means as well as a first base and a first wormscrew extending between the first magnetization means and the first base and passing through a first stationary nut, said first base including teeth engaged with a first rack, said movable stud having a winder around which there is wound a safety line that carries a ball-lock pin, said winder being movable in translation along said first longitudinal axis of the movable stud and being pushed by a first spring member against said first movement means so as to be constrained to move in translation with the first magnetization means of the movable stud, said winder including a toothed face engaged with at least one tooth of a casing of the movable stud in the engagement position.

In addition, the stationary stud may include second magnetization means carried by second movement means, said second movement means including an arm connected to the second magnetization means and also to a second base and a second wormscrew extending between the second ball joint and the second base while passing through a second stationary nut, said second base including teeth engaged with a second rack, said second rack having a receptacle in which a ball-lock pin of the movable stud can be engaged.

Before fastening the panel to a structure, the second magnetization means are set back within the stationary stud, namely in the disengagement position. In the same way, the first magnetization means are set back within the movable stud, namely in the disengagement position.

The operator then positions the panel relative to the structure, e.g. by making it pivot by means of a pivot joint.

The operator then inserts the ball-lock pin into the receptacle of the stationary stud. This insertion causes the second rack to move and consequently causes the second magnetization means to move in translation towards the outside of the stationary stud.

This operation is possible because the winder is then no longer engaged with the teeth of the movable casing. Consequently, the operator can pull on the safety line in order to unwind it and plug the ball-lock pin into the stationary stud.

The operator then moves the panel to bring the movable stud closer to the stationary stud. Since the first magnetization means are set back in the first casing, the first magnetization means do not come into contact with the second magnetization means, and that can avoid banging of the magnet(s).

The operator then moves the first magnetization means by bringing them closer to the second magnetization means by operating the first rack or by means of a tool.

This longitudinal movement towards the outside of the first casing also causes the winder to move towards the teeth of the first casing.

When the first magnetization means reach the engagement position, the first magnetization means are strongly magnetically attracted to the second magnetization means. In addition, the winder is engaged on the teeth of the first casing.

In order to remove the panel, the operator can perform the above-described steps in reverse order.

In addition, the fastener device may include a member made from an elastomer interposed between the magnetization means of a stud and a casing of said stud, either between a ball joint and said casing or by being interposed between the movement means and said casing.

Each stud under consideration includes vibration-damper means, namely the elastomer member that uncouples the ball joint from the casing.

Possibly, a threaded knob is used to prestress the elastomer so as to modify its stiffness in order to match it to the system under consideration. This knob makes it possible to adjust the damping of the damper means after flight tests, without having to change the definition of the system.

In addition to a fastener device, the invention seeks to provide an aircraft provided with a structure and with at least one trim panel. The aircraft thus includes at least one fastener device of the invention.

BRIEF DESCRIPTION OF THE SEVERAL VIEWS OF THE DRAWINGS

The invention and its advantages appear in greater detail in the context of the following description of embodiments given by way of illustration and with reference to the accompanying figures, in which:

FIG. 3 is a section view of a movable stud showing its first rack;

FIG. 4 is a section view of a stationary stud showing its second rack;

FIG. 5 shows a movable stud in a disengaged position obtained by moving the first rack with a cable-operated control;

FIG. 6 shows a movable stud in a disengaged position obtained by means of a tool;

FIGS. 7 to 10 are views explaining how a movable stud is secured to a stationary stud; and FIGS. 11 to 12 are views explaining operation in the event of a crash, in particular of a fastener device provided with a crash-proofing system.

Elements that are present in more than one of the figures are given the same references in each of them.

DETAILED DESCRIPTION OF THE INVENTION

Figure 1:
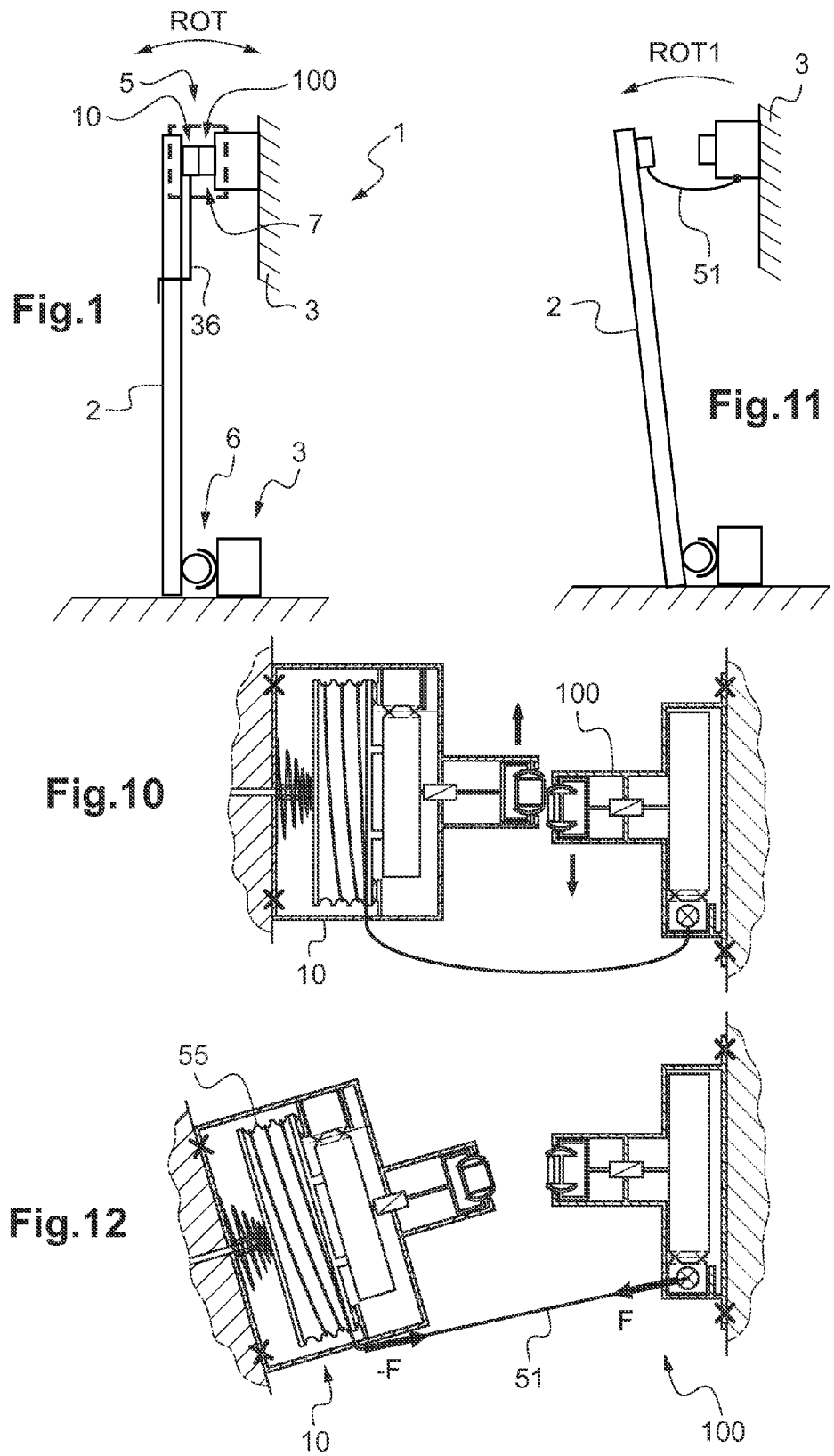
FIG. 1 is a section view of an aircraft provided with a panel fastened to a structure via a fastener device of the invention.

FIG. 1 shows an aircraft 1 including at least one panel 2 for fastening to a structure 3. By way of example, a trim panel 2 is to be fixed to a structure defining a cabin, at least in part.

Under such circumstances, the aircraft 1 is provided with a fastener device 5.

This fastener device 5 includes at least one fastener assembly 7 for fastening a panel 2 in reversible manner to the structure 3. Such a fastener assembly 7 thus includes both a movable stud 10 that is fastened to the panel 2, and also a stationary stud 100 that is fastened to the structure 3 using conventional means.

In addition, the fastener device shown also includes at least one pivot joint 6. This pivot joint 6 includes a portion fastened to the structure 3 and a portion fastened to the panel 2 in order to allow a movement in rotation ROT of the panel 2 relative to the structure 3.

For example, at least one fastener assembly is located in a top section of the panel, whereas at least one pivot joint is situated at the foot of the panel 2.

In a variant, the fastener device includes a plurality of fastener assemblies but does not have a pivot joint.

Figure 2:
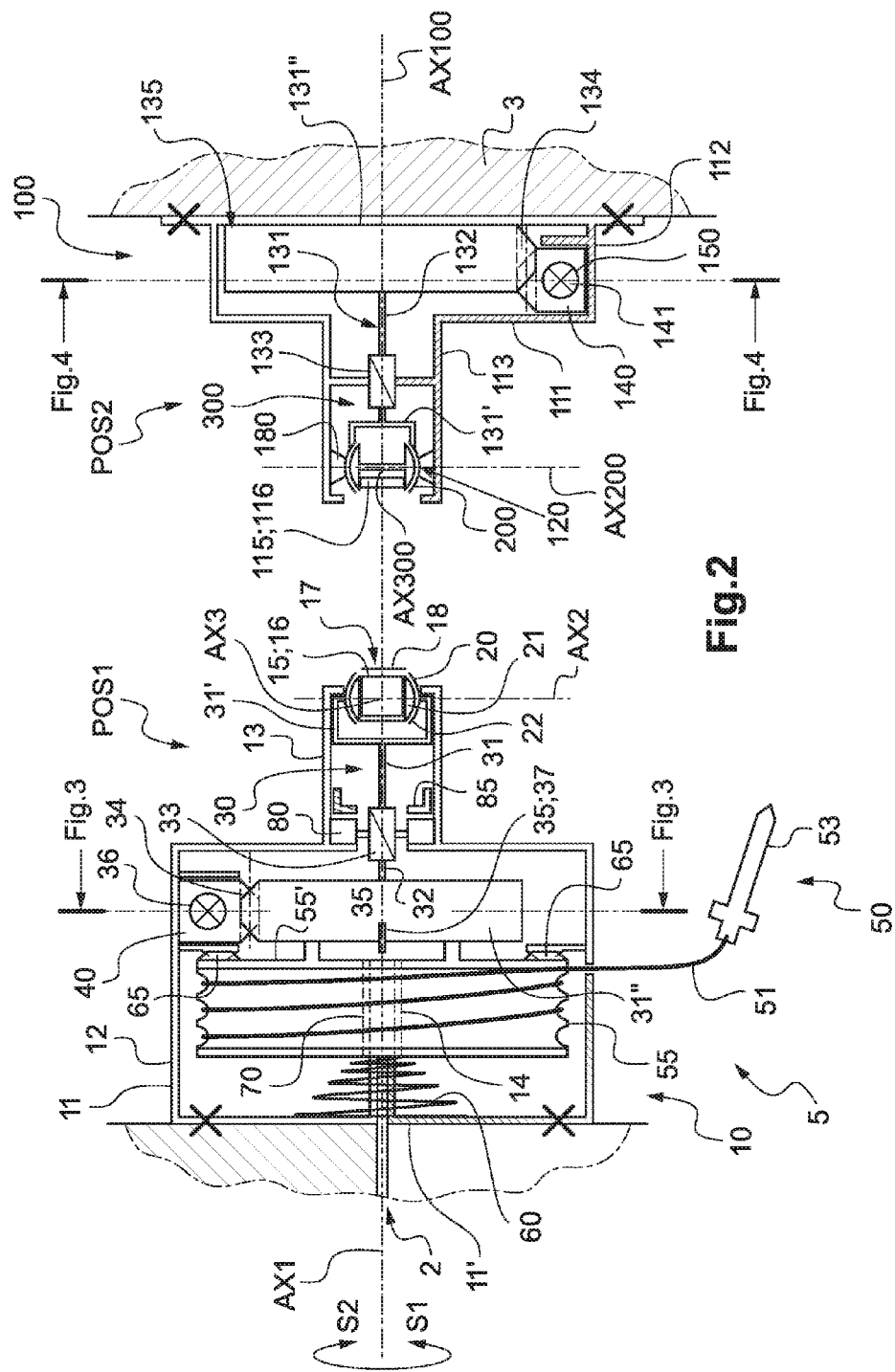
FIG. 2 is a diagrammatic view of a fastener assembly.

With reference to FIG. 2, each stud includes magnetization means 15, 115 in order to adhere to each other in reversible manner. More precisely, at least one magnetization means includes a magnet 16, the other magnetization means of a fastener assembly 7 including either another magnet or a metal plate that is sensitive to a magnetic field.

Moreover, each magnetization means presents a connection face for being magnetically attracted to the other magnetization means. Under such circumstances, at least one connection face can be covered with a conventional antifriction member 18.

For example, the magnetization means referred to as "first magnetization means 15" of the movable stud is a magnet 16 covered with an antifriction member 18. The magnetization means referred to as "second magnetization means 115" of the stationary stud then comprise for example a metal plate 116.

In addition, each stud 10, 100 includes a casing. This casing can be considered as comprising a rear portion 12, 112 fastened either to the panel or to the carrier structure 3, and a front portion 13, 113 facing the other front portion.

Consequently, the movable stud has a first casing 11 provided with a first rear portion 12 fastened to the panel 2 and a first front portion 13. The stationary stud has a second casing 111 provided with a second rear portion 112 fastened to the structure 3 and a second front portion 113 facing the first front portion 13.

At least one stud further includes a ball joint 20, 200 arranged in the front portion of the stud. Each ball joint carries the associated magnetization means 15, 115 in order to allow it three degrees of freedom of movement in rotation about a longitudinal axis AX1, AX100 of the stud passing through the panel and the structure, and also about a transverse axis AX3, AX300, and an elevation axis AX2, AX200 that is substantially parallel to the panel and to the structure.

The longitudinal axes AX1, AX100 of the movable and stationary studs 15, 115 of a fastener assembly are respectively referred to as the first longitudinal axis AX1 and the second longitudinal axis AX100. The first longitudinal axis is substantially orthogonal to the panel 2, the second longitudinal axis AX100 being substantially orthogonal to the structure 3.

The first longitudinal axis AX1 and the second longitudinal axis AX100 are parallel and in alignment in the absence of undue offset when the studs are secured to each other. However, such absence of offset is a theoretical ideal. As explained below, the invention makes it possible to accommodate such an offset.

In addition, each stud includes movement means carrying magnetization means, via a ball joint where appropriate. The movement means confer a degree of freedom of movement in translation to the magnetization means of the stud along the corresponding longitudinal axis. More precisely, each magnetization means can be moved in translation in the casing of the stud from an engagement position towards a disengagement position.

The magnetization means 15, 115 of the movable stud and of the stationary stud are strongly attracted magnetically to each other when they are facing and each of them is in the engagement position POS1, and they are magnetically attracted only slightly or not at all when at least one magnetization means 15, 115 is in the disengagement position POS2. In the engagement position, one magnetizing means projects longitudinally from the casing of the associated stud.

Such movement means may include an arm 31, 131 directly carrying magnetization means, or carrying the ball joint 20, 200 of the stud. By way of example, the arm carries an outer cage 22 of the ball joint in which a truncated ball 21 carrying the magnetization means is free to move in rotation.

This arm 31, 131 comprises a wormscrew 32, 132 engaged with a nut 33, 133 and attached directly or indirectly to the casing of the stud 10, 100 under consideration.

In addition, the movement means 30, 300 are provided with drive means 35, 135 in order to rotate the arm 31, 131 in order to generate its movement in translation.

By way of example, each arm 31, 131 extends longitudinally from a distal end 31', 131' carrying magnetization means, where appropriate via a ball joint, towards a proximal end 31", 131" that is provided with a toothed base 31"', 131"'. The drive means 35, 135 then comprise a transversely movable rack 40, 140 that is engaged with a tooth 34, 134 on a periphery of the base 31"', 131"' of the movement means.

By way of example, the movable stud 10 includes first magnetization means 15 carried by a first arm, via a ball joint referred to as the "first ball joint 20" in the example shown.

This first ball joint 20 is fastened to movement means referred to as "first movement means" 30. More precisely, an arm referred to as the "first arm 31" of the first movement means carries the first ball joint 20 at its first distal end. By way of example, the first arm includes a fork fastened to an outer cage of the first ball joint.

Moreover, the first arm carries a base referred to as the "first base 31"'" at its first proximal end. The first arm thus includes, between its first distal end and its first proximal end, a first wormscrew 32 passing through a first nut 33 that is stationary relative to the first arm.

At its periphery, the first base 31" includes teeth 34 engaged with a rack referred to as the "first rack 40".

With reference to FIG. 3, a first spring member 42 may be arranged between the first casing and the first rack 40. This first spring member tends to position the first rack 40 in a first position POS11 as shown in FIG. 3, which leads to the first magnetization means being positioned in the engagement position of FIG. 1.

In opposition to this first spring member, the first rack 40 is moved along arrow F1 towards a second position POS12, giving rise to the first magnetization means being positioned in the disengagement position.

With reference to FIG. 1, the drive means of the movable stud 10 may include a cable 36 that is secured to the first rack of the movable stud.

Additionally or alternatively, these drive means may comprise a screw-turning tool 38 cooperating with an orifice 37 of the movement means.

By way of example, the tool 38 may be inserted into an orifice of the arm 31 of the movable stud, and in particular of its base 31".

Under such circumstances, the first casing 11 of the movable stud and in particular its first rear portion 12 may include a passage 39 guiding the tool towards the orifice 37.

Movement of the cable 36 and/or rotation of the tool 38 then causes rotation of the first arm, this rotation generating movement of the first arm in translation within the first casing 11.

In addition, the stationary stud 100 includes second magnetization means 115 carried by a distal second end of a second arm, via a ball joint referred to as the "second ball joint 200", for example.

Moreover, the second arm carries a base referred to as the "second base 131'"" at its proximal second end. The second arm thus includes, between its distal second end and its proximal second end, a second wormscrew 132 passing through a second nut 133 that is stationary relative to the first arm.

At its periphery, the second base 131" includes teeth referred to as "second teeth 134" engaged with a rack referred to as the "second rack 140".

With reference to FIG. 4, a second spring member 142 may be arranged between the second casing and the second rack 140. This second spring member tends to position the second rack 140 in a second position POS112 as shown in FIG. 4, which leads to the second magnetization means being positioned in the disengagement position of FIG. 1.

In opposition to this second spring member, the second rack 140 is moved along arrow F2 towards a first position POS111 giving rise to the second magnetization means being positioned in the engagement position.

In addition, and with reference to FIG. 2, the fastener assembly may include a crash-proofing system 50.

This crash-proofing system 50 comprises a safety line 51 that is wound up around a winder 55, e.g. an automatically-locking winder, of the movable stud 10. The safety line thus extends from a segment fastened to the winder towards a segment carrying a ball-lock pin 53.

This ball-lock pin is insertable manually and in reversible manner in a receptacle 150 that is secured to the second casing 111 of the stationary stud 100.

More precisely, in the absence of the ball-lock pin 53, a pin 141 of the second rack 140 of the stationary stud 100 passes through the receptacle 150. The second magnetization means 115 of the stationary stud 100 are then in the disengagement position POS2. FIG. 4 shows such an arrangement of the pin 141 in the receptacle 150.

However, when the ball-lock pin 53 is housed in the receptacle 150, said ball-lock pin 53 pushes the second rack along arrow F2. The second magnetization means 115 of the stationary stud 100 are then moved into the engagement position.

Consequently, the ball-lock pin represents drive means suitable for moving the second rack.

In addition and with reference to FIG. 2, the winder 55 is movable in translation along the first longitudinal axis AX1 of the movable stud 10. To this end, and by way of example, the winder 55 is arranged around guide means 14 for guiding the first casing 11. The winder is then movable both in translation and also in rotation about the first longitudinal axis AX1 in the first rear portion 12 of the first casing 11.

This winder 55 may be pressed against the movement means 30 by a spring member 60 in order to be constrained to move in translation with the first magnetization means 15 of the movable stud 10. The spring member 60 may be a stationary conical spring fastened to an end wall 11' of the first casing that is secured to the panel 2.

Moreover, the first casing 11 may include at least one tooth 65 engaged with a toothed face 55' of the winder 55 in the engagement position POS1. In this position, each tooth 65 of the casing prevents the winder 55 from turning in an unwinding direction of rotation S1 that would enable the safety line 51 to be unwound from the winder.

However, the movement in translation of the winder towards the disengaged position moves the toothed face 55' away from the teeth of the first casing. Thus, the toothed face of the winder is the face of the winder that faces the first magnetization means.

In addition, the winder 55 possibly includes a return spring 70 tending to generate movement of the winder in a winding direction of rotation S2 in order to wind the safety line 51 around the winder 55.

In addition, the fastener device 5 shown diagrammatically includes at least one elastomer member 80, 180 interposed directly or indirectly between a ball joint 20, 200 of a stud 10, 100 and a casing 11, 111 of said stud 10, 100.

By way of example, the movable stud includes a first elastomer member interposed indirectly between the first ball joint 20 and the first casing 11, while being arranged between the first nut and the first casing. A threaded washer 85 enables the first elastomer member to be pre-stressed.

It should be understood that the first casing of the movable stud gives access to the washer 85. By way of example, the front portion 13 of the first casing of the movable stud may be shortened, the washer projecting from this front portion in order to be handled by an operator.

The stationary stud shown diagrammatically includes a second elastomer member 180 that is interposed directly between the second ball joint 120 and the second casing 11. However, this second elastomer member 180 is not secured to the second ball joint 120 in order to enable this second ball joint to slide.

This arrangement is not limiting. The stationary stud may for example include an elastomer member that is indirectly interposed between the second ball joint and the second casing 111, while being arranged between the second nut and the second casing.

FIGS. 2 and 5 to 12 explain the operation of the fastener device.

With reference to FIG. 2, before the movable stud 10 is connected to the stationary stud 100, the movable stud is in its engagement position. The winder, the first arm, the first ball joint, and the first magnetization means are each positioned as far away as possible from the panel 2.

In contrast, the stationary stud is in the disengagement position. The second arm, the second ball joint, and the second magnetization means are each positioned as close as possible to the structure 3.

An operator then moves the movable members of the movable stud towards their disengagement position.

In FIG. 5, the operator operates the cable 36 and that causes the first rack 40 to move in translation along arrow F3.

This movement in translation causes the first arm 31 to move in rotation as shown by arrow F4. The presence of the first nut consequently causes the first arm, the first ball joint, and the first magnetization means to move in translation along arrow F5. The first base 31" exerts force on the winder 55, enabling said winder to move longitudinally by compressing the spring member 60.

The winder, the first arm, the first ball joint, and the first magnetization means are each positioned in the disengagement position as close as possible to the panel 2.

In the same way, the movable members of the corresponding stationary stud are in the disengagement position.

According to an alternative method shown diagrammatically in FIG. 6, the operator inserts the tool 38 through the panel 2 in the movable stud. Using this tool, the operator then rotates the first arm directly.

Under such circumstances, and with reference to FIG. 5, the operator pushes the panel 2 to bring it closer to the structure 3.

The operator then takes hold of the ball-lock pin 53 in order to insert it in the receptacle of the stationary stud. Since the winder 55 is not locked by the teeth 65 of the first casing, said operator can indeed unwind the safety line in order to operate the ball-lock pin.

The insertion of the ball-lock pin into the receptacle causes the second arm, the second ball joint, and the second magnetization means to move towards their engagement positions shown in FIG. 7.

However, the first magnetization means remain in their disengagement position.

By releasing the safety line, the operator enables the spring member to rotate the winder in order to rewind the safety line. The movable stud then presses against the stationary stud.

With reference to FIG. 8, the operator then uses drive means of the movable stud in order to press the first magnetization means 15 against the second magnetization means 115 of the stationary stud.

The movable stud is then magnetically attracted to the stationary stud and that makes it possible to fasten the panel 2 to the structure 3.

It should be noted that if the ball-lock pin is not inserted in the stationary stud, this magnetic attraction is not possible. Indeed, in the absence of the ball-lock pin, the movable members of the stationary stud are in the disengagement position. This characteristic is advantageous from a safety point of view.

With reference to FIG. 9, having the magnetization means arranged on at least one ball joint makes it possible to accommodate an angular offset between the panel 2 and the structure 3.

In the same way, and with reference to FIG. 10, this arrangement makes it possible to accommodate an axial offset between the panel 2 and the structure 3.

In the event of a crash, by way of example and with reference to FIG. 11, the magnetizing power of the magnetization means of the movable and stationary studs and thus the magnetic attraction between them can prove to be insufficient for holding the panel against the structure 3.

This panel then pivots relative to the structure 3. However, since the winder of the movable stud is blocked by the first casing, this rotary movement is stopped by the safety line 51.

With reference to FIG. 12, the interface forces F exerted on the fastener device can be calculated analytically, since their directions and their values are known.

That makes it easier to use calculation to demonstrate that the fastener is appropriately crashworthy.

Naturally, the present invention may be subjected to numerous variants as to its implementation. Although several implementations are described, it should readily be understood that it is not conceivable to identify exhaustively all possible implementations. It is naturally possible to envisage replacing any of the means described by equivalent means without going beyond the ambit of the present invention.

What is claimed is:

1. A fastener device for fastening a panel to a structure, the fastener device being provided with at least one fastener assembly including a movable stud suitable for being fastened to the panel and a stationary stud suitable for being fastened to the structure, the movable stud including first magnetization means co-operating with second magnetization means of the stationary stud, at least one of the first and second magnetization means including a magnet, wherein at least one magnetization means is carried by a ball joint of the associated stud, each magnetization means being constrained to move in translation with movement means so as to be moved in translation in reversible manner along a first longitudinal axis of the associated stud from an engagement position to a disengagement position, the first longitudinal axis of the movable stud being substantially parallel to a second longitudinal axis of the stationary stud, the magnetization means being strongly magnetically attracted to each other when they are facing and each is in the engagement position, and being magnetically attracted only slightly or not at all when at least one magnetization means is in the disengagement position.

2. The fastener device according to claim 1, wherein the fastener device includes at least one pivot joint suitable for being fastened to the panel and to the structure in order to allow the panel to move in rotation relative to the structure.

3. The fastener device according to claim 1, wherein either each of the magnetization means includes a respective magnet, or one of the magnetization means includes a magnet and the other magnetization means includes a metal plate.

4. The fastener device according to claim 1, wherein at least one of the magnetization means includes a connection face for being magnetically attracted to the other magnetization means, the connection face is covered by an antifriction member.

5. The fastener device according to claim 1, wherein at least one stud comprises movement means provided with an arm, the arm comprising a wormscrew engaged in a nut attached to a casing of the stud, the movement means being provided with drive means for driving the arm in rotation so as to cause the arm to move in translation.

6. The fastener device according to claim 5, wherein the arm extends longitudinally from an end that is connected to magnetization means towards an end that is provided with a toothed base, the drive means including a rack that is movable transversely, a periphery of the toothed base being toothed at least in part and including at least one tooth engaged with the rack.

7. The fastener device according to claim 6, wherein the drive means of the movable stud include a cable that is secured to the rack.

8. The fastener device according to claim 5, wherein the drive means of the movable stud comprise an orifice in the arm that is suitable for receiving the head of a screw-turning tool, a casing of the movable stud including a passage for guiding such a tool towards the orifice.

9. The fastener device according to claim 1, wherein the fastener device includes a crash-proofing system provided with a safety line that is wound around an automatically-locking winder of the movable stud, the safety line carrying a ball-lock pin.

10. The fastener device according to claim 9, wherein the winder is movable in translation along the first longitudinal axis of the movable stud by being arranged around guide means of a casing of the movable stud, the winder being pressed by means of a spring member against the movement means so as to be constrained to move in translation with the magnetization means of the movable stud.

11. The fastener device according to claim 9, wherein the casing includes at least one tooth that co-operates with a toothed face of the winder in order to prevent rotation of the winder in an unwinding direction of rotation that makes it possible to empty out the safety line, when the magnetization means are in the engagement position.

12. The fastener device according to claim 9, wherein the receptacle has passing therethrough a pin of a rack that is engaged on the movement means of the stationary stud in the absence of the ball-lock pin, the magnetization means of the stationary stud being in the disengaged position in the absence of the ball-lock pin.

13. The fastener device according to claim 9, wherein the winder includes a return spring tending to generate rotation of the winder in a winding direction of rotation in order to wind the safety line around the winder.

14. The fastener device according to claim 1, wherein the movable stud includes a first rack that co-operates with the movement means of the movable stud, the first rack is movable between a first position setting the magnetization means of the movable stud into the engagement position and a second position setting the magnetization means of the movable stud into the disengagement position, and the movable stud includes a first spring member exerting a force tending to position the first rack in the first position.

15. The fastener device according to claim 1, wherein the stationary stud includes a second rack that co-operates with the movement means of the stationary stud, the second rack is movable between a first position setting the magnetization means of the stationary stud into the engagement position and a second position setting the magnetization means of the stationary stud into the disengagement position, and the stationary stud includes a second spring member exerting a force tending to position the second rack in the second position.

16. The fastener device according to claim 1, wherein the movable stud includes a first magnetization means carried by a first movement means, the first movement means including an arm connected to the first magnetization means as well as a first base and a first wormscrew extending between the first magnetization means and the first base and passing through a first stationary nut, the first base including teeth engaged with a first rack, the movable stud having a winder around which there is wound a safety line that carries a ball-lock pin, the winder being movable in translation along the first longitudinal axis of the movable stud and being pushed by a first spring member against the first movement means so as to be constrained to move in translation with the first magnetization means of the movable stud, the winder including a toothed face engaged with at least one tooth of a casing of the movable stud in the engagement position.

17. The fastener device according to claim 1, wherein the stationary stud includes the second magnetization means carried by a second movement means, the second movement means including an arm connected to the second magnetization means and also to a second base and a second wormscrew extending between a second ball joint and the second base while passing through a second stationary nut, the second base including teeth engaged with a second rack, the second rack having a receptacle.

18. The fastener device according to claim 1, wherein the fastener device includes a member made from an elastomer interposed between the magnetization means of the movable stud and a casing of the stud, either between the ball joint and the casing or by being interposed between the movement means and the casing.

19. The fastener device according to claim 1, wherein each magnetization means is carried by the ball joint.

20. An aircraft provided with a structure and with at least one trim panel, wherein the aircraft includes at least one fastener device according to claim 1.

* * * * *